UNITED STATES PATENT OFFICE.

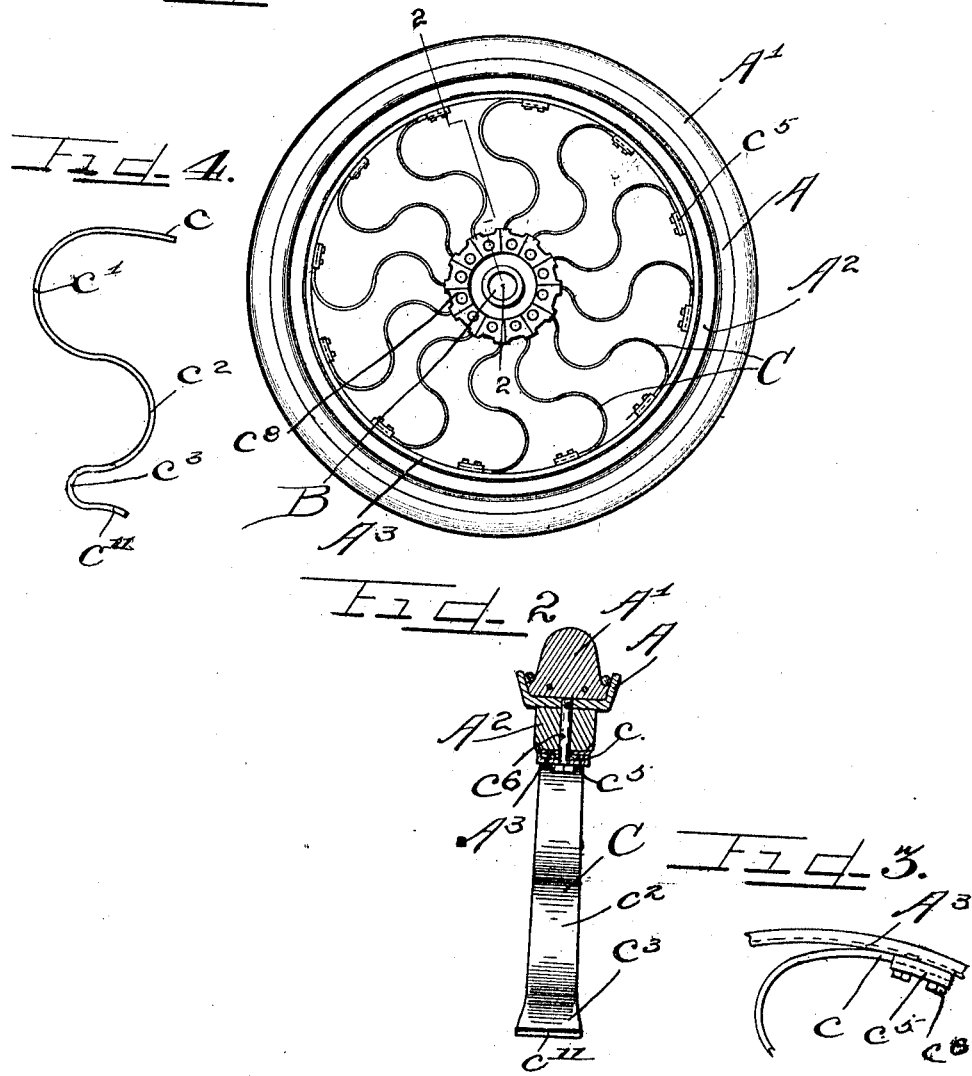

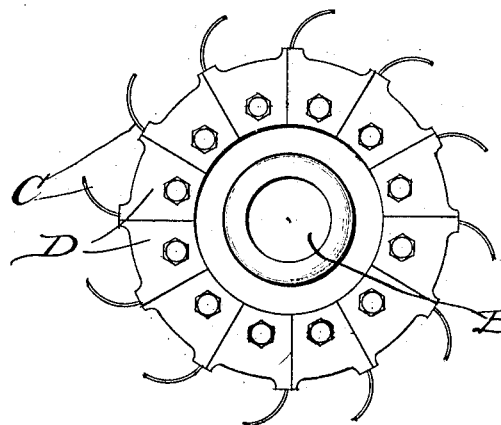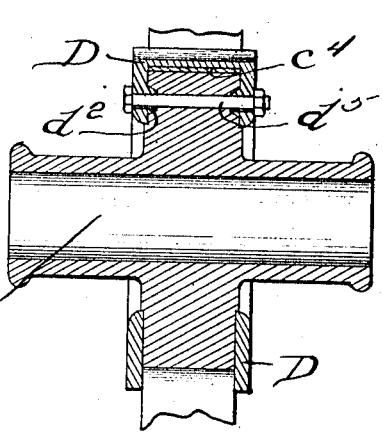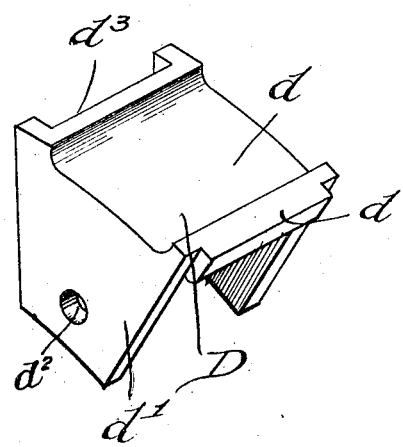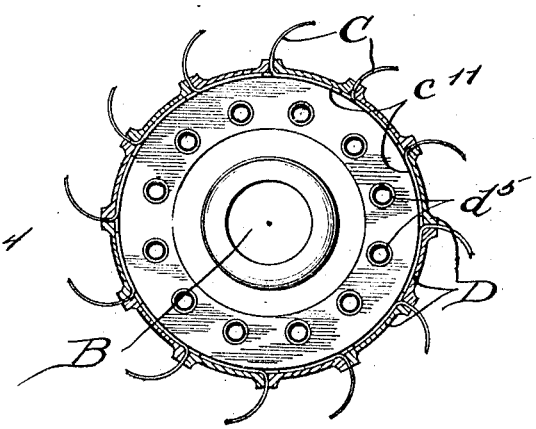

PIÈRRE HAERST, OF CHICAGO, ILLINOIS.

WHEEL.

1,020,901.  Specification of Letters Patent.  Patented Mar. 19, 1912.

Application filed July 1, 1907. Serial No. 381,603.

*To all whom it may concern:*

Be it known that I, PIÈRRE HAERST, a citizen of the United States, and a resident of Chicago, Cook county, Illinois, have invented certain new and useful Improvements in Wheels; and I do hereby declare that the following is a full, clear, and exact description of the same, reference being had to the accompanying drawings, and to the letters of reference marked thereon, which form a part of this specification.

This invention relates to improvements in wheels and particularly to that class having resilient spokes.

Wheels heretofore constructed employing spring or resilient spokes have often had the spokes pivoted either at the hub or rim end or at both ends. Where spring or resilient spokes are pivoted to the hub or rim the action of the spokes at the pivot shears the pivot bolts in a very short time thus making such wheels impractical. Again where the spring spokes are pivoted at the hub considerable damage is caused to the spokes and hub each time the vehicle is suddenly started or stopped as the hub twists or turns a part of a revolution relatively of the rim causing undue straining. Lateral stress is also destructive to such a wheel.

It is an object of this invention to provide a wheel having spring spokes in which the spokes are rigidly secured to the hub and the rim.

It is a further object of this invention to provide novel means for securing the spokes to the hub and rim and in which any one or more spokes may be independently removed and replaced and to provide tightening means for the spokes at the hub.

It is an important object of this invention to provide a spring spoke comprising at least three bends or folds and in which the ends are attached to the rim and hub out of radial alinement thereby utilizing the resiliency of the spokes to the utmost, and equalizing the stress on all the folds of the spokes and increasing the efficiency of the wheel.

The invention relates to the matters hereinafter described and more fully pointed out and defined in the appended claims.

On the drawings: Figure 1 is a side elevation of a wheel embodying my invention. Fig. 2 is an enlarged section on lines 2—2 of Fig. 1. Fig. 3 is an enlarged fragmentary detail illustrating the mode of attaching the spokes to the rim. Fig. 4 is an enlarged detail of the spoke. Fig. 5 is a side elevation of a sectional hub embodied in my invention. Fig. 6 is a cross section of the hub on line 2—2 of Fig. 1. Fig. 7 is a side elevation showing the end of the spoke secured in place. Fig. 8 is an enlarged perspective view of the sector for securing the spoke to the hub.

As shown in said drawings: A indicates a channeled rim constructed of steel or any suitable material adapted to receive the rubber tread $A'$ therein and which is rigidly secured on a felly $A^2$ in any suitable manner. Within the felly is secured an inner rim $A^3$ also of steel which is also rigidly engaged in place.

The hub B is preferably constructed of metal and is provided with bolt holes spaced equal distances apart. The hub at the extremities of the holes is recessed to provide tapered or cone shaped sockets. The spring spokes C employed are leaf spring or flat spring bars of suitable length and strength which are of greatest width at the hub and taper to the rim end. Said resilient spokes at the rim end $c$ conform to the inner periphery of the rim and are compoundly curved affording as shown three folds or curved portions $c'$—$c^2$—$c^3$ between the ends, and the hub end $c^{11}$, is curved to conform to the hub. The outer ends of the spokes are secured to the felly by means of caps or flanged plates $c^5$ which engage outside the end of the spoke with the flanges inclosing the sides of the spoke and bolts $c^6$ extend through apertures in the cap, spoke and felly and are threaded into the ring.

The hub is suitably faced on opposite sides thereof and clamping sections D engage the spokes to the hub. Said clamping sections comprise each a top plate $d$ having integral downwardly directed sector shaped side plates $d'$, provided with alined apertures therethrough which register with apertures in the hub and surrounding each of which on the inner sides are cone shaped bosses $d^2$, which fit in corresponding sockets or recesses in the hub, and act when forced into the sockets to rigidly clamp the ends $c^{11}$ of the spoke between the plate $d$ and periphery of the hub. The side plates $d'$ bind the spokes laterally. The side plates $d'$ of said members diverge slightly outwardly and are adapted to be sprung on the tread of the hub into place, after which the bosses are forced into the sockets thereby drawing the top plates tight. As shown each top plate $d$ of each clamp is provided with a notch $d^3$, at one end with which engages a complemental projection $d^4$, on the opposite end of an adjacent section affording a very secure and rigid construction, and bolts $d^5$ or other suitable means secure and clamp the sections in position. Furthermore it will be noted that the spokes are greater in size or width at the hub than at the rim. This is very important especially with a spring or resilient spoke inasmuch as the strain is considerably greater at the hub than at the rim for almost invariably the spokes heretofore have broken at the hub.

The operation is obvious from the construction described.

Details of construction may be varied and I do not desire to limit this application otherwise than necessitated by the prior art.

I claim as my invention:

1. In a device of the class described the combination with a hub and rim of resilient spokes engaged at their outer ends to the rim, individual clamping sections for securing the inner ends of the spokes to the hub, said sections provided with interfitting recesses and projections and means for securing the clamping sections in place.

2. In a wheel the combination with the rim and hub provided with apertures therein, of spring spokes having a plurality of bends therein, means for attaching the outer ends of the spokes to the rim, U-shaped clamping sections adapted to attach the hub ends of the spokes to the hub and provided with conical bosses to fit in the apertures in the hubs and means for forcing the bosses into the apertures to draw the clamping plates to rigidly secure the ends of the spokes in place.

3. In a wheel a hub, a rim, spring spokes curved at one end to conform to the hub and directed outwardly having a plurality of curves between the hub ends and rim ends, clamping members, each notched at one end to receive the outwardly directed end of one of the spokes therein and provided with a projection on the opposite end to fit in the recess in an adjacent clamping member.

In testimony whereof I have hereunto subscribed my name in the presence of two subscribing witnesses.

PIERRE HAERST.

Witnesses:
C. W. HILLS,
K. E. HANNAH.

---

Copies of this patent may be obtained for five cents each, by addressing the "Commissioner of Patents, Washington, D. C."